(12) United States Patent
Beswick et al.

(10) Patent No.: US 6,314,980 B1
(45) Date of Patent: Nov. 13, 2001

(54) PRESSURE COMPENSATOR FLOW CONTROL

(76) Inventors: Paul R. Beswick, 44 Gundalow Landing, Newington, NH (US) 03801; Gary Treadwell, 16 Tideview Estates, Dover, NH (US) 03820

( * ) Notice: Subject to any disclaimer, the term of this patent is extended or adjusted under 35 U.S.C. 154(b) by 0 days.

(21) Appl. No.: 09/666,665

(22) Filed: Sep. 20, 2000

Related U.S. Application Data

(60) Provisional application No. 60/154,999, filed on Sep. 21, 1999.

(51) Int. Cl.[7] .................................................... G05D 7/01
(52) U.S. Cl. .................................................. 137/8; 137/501
(58) Field of Search ............................ 137/8, 501, 505.25

(56) References Cited

U.S. PATENT DOCUMENTS

| | | | |
|---|---|---|---|
| 353,342 | * 11/1886 | Wilder | 137/501 |
| 3,115,892 | * 12/1963 | Brewer | 137/501 |
| 4,471,803 | * 9/1984 | Ollivier | 137/462 |
| 5,913,328 | * 6/1999 | Taube et al. | 137/315 |

FOREIGN PATENT DOCUMENTS

939661 * 10/1963 (GB) ................................. 137/501

OTHER PUBLICATIONS

Conway, H.G., "Fluid Pressure Mechanisms"; London Sir Isaac Pitman & Sons, LTD, (1949).

* cited by examiner

*Primary Examiner*—Stephen M. Hepperle
(74) *Attorney, Agent, or Firm*—Kirkpatrick & Lockhart LLP.

(57) ABSTRACT

A pressure compensating flow control device is disclosed which has a needle valve/spring assembly as a reference restriction which is in axial alignment with a reducing valve situated in a housing of the device. A piston and piston rod is provided in axial alignment with the needle valve and reducing valve to provide compensation for alterations to pressure differential about the piston. The piston rod has an internal channel to allow for fluid communication between inlet and outlet chambers and to allow for passive control of pressure differential.

The device provides pressure control for low fluid flows and low pressures.

20 Claims, 13 Drawing Sheets

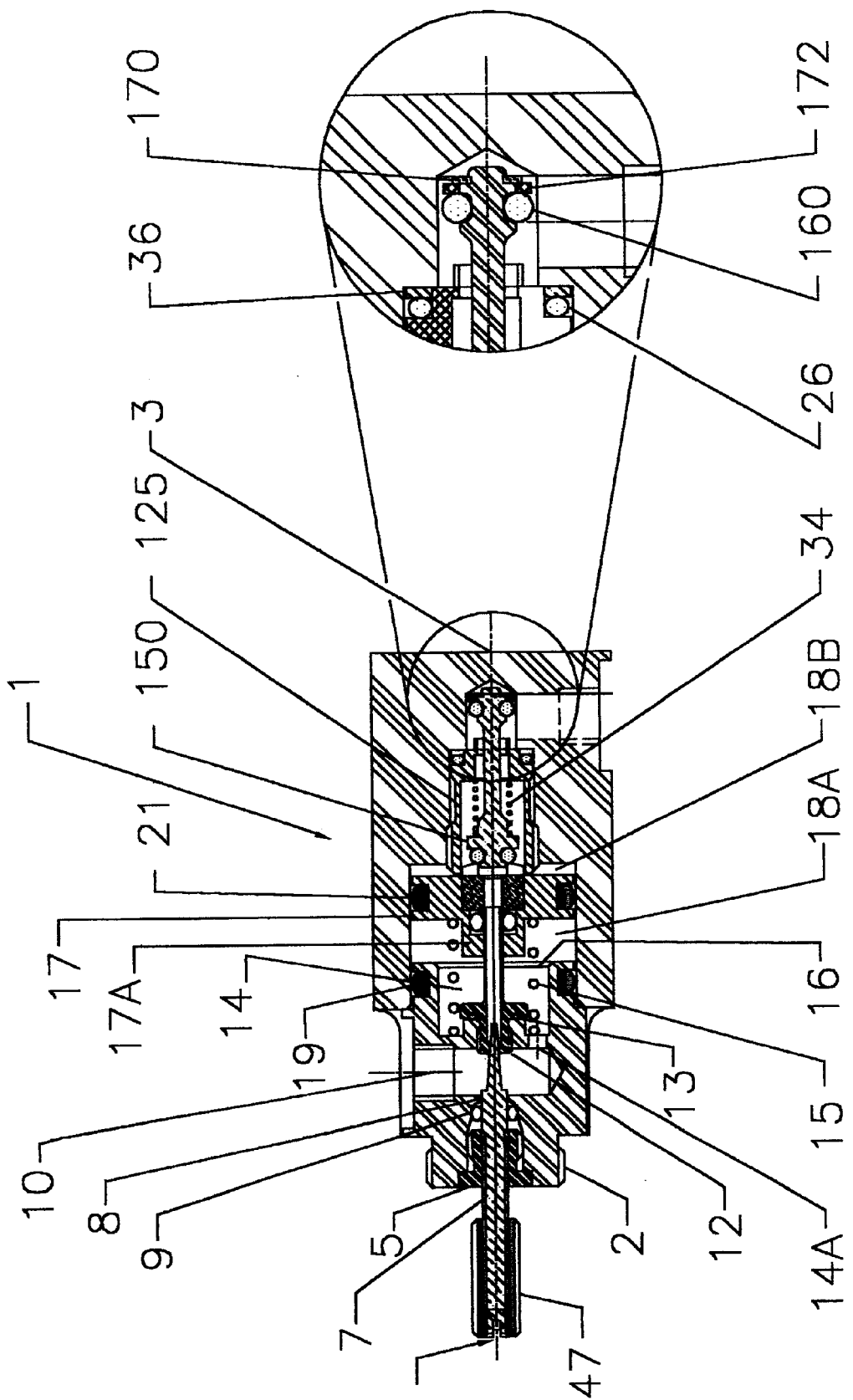

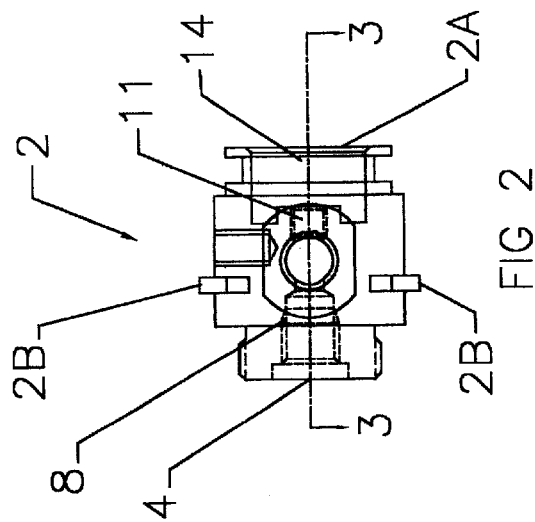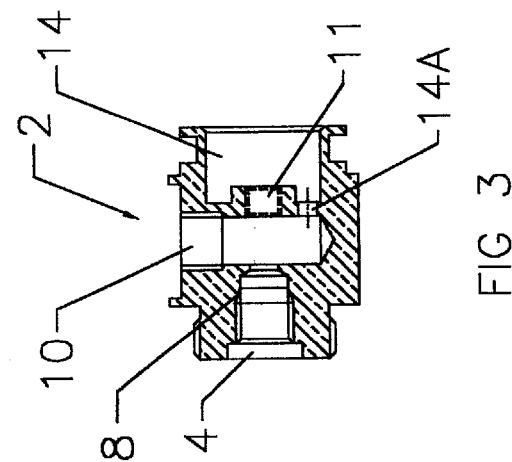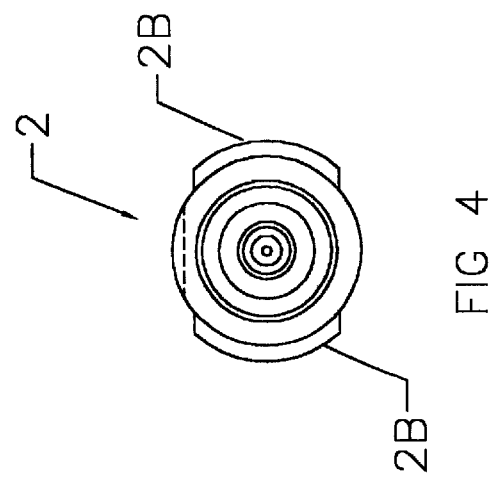

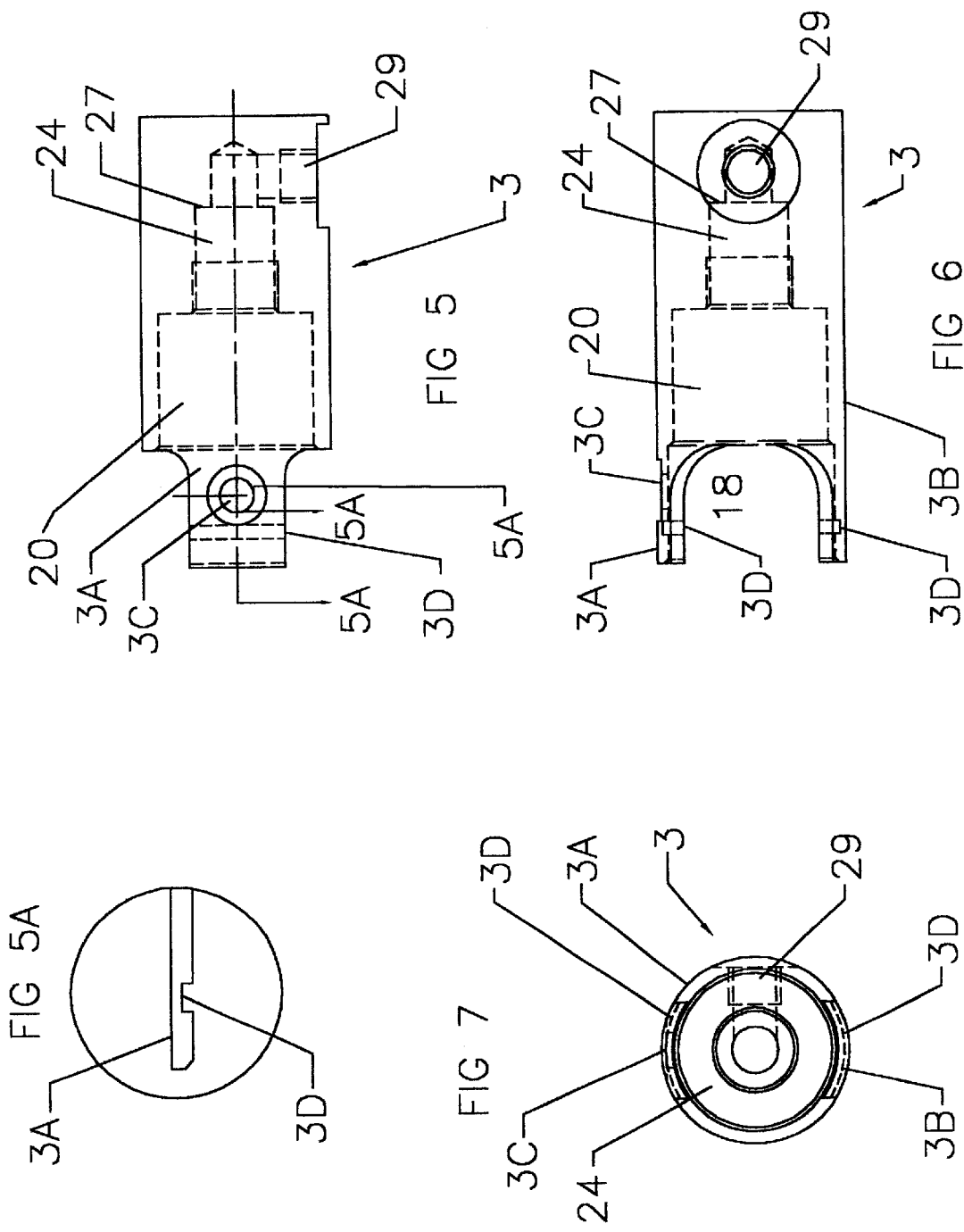

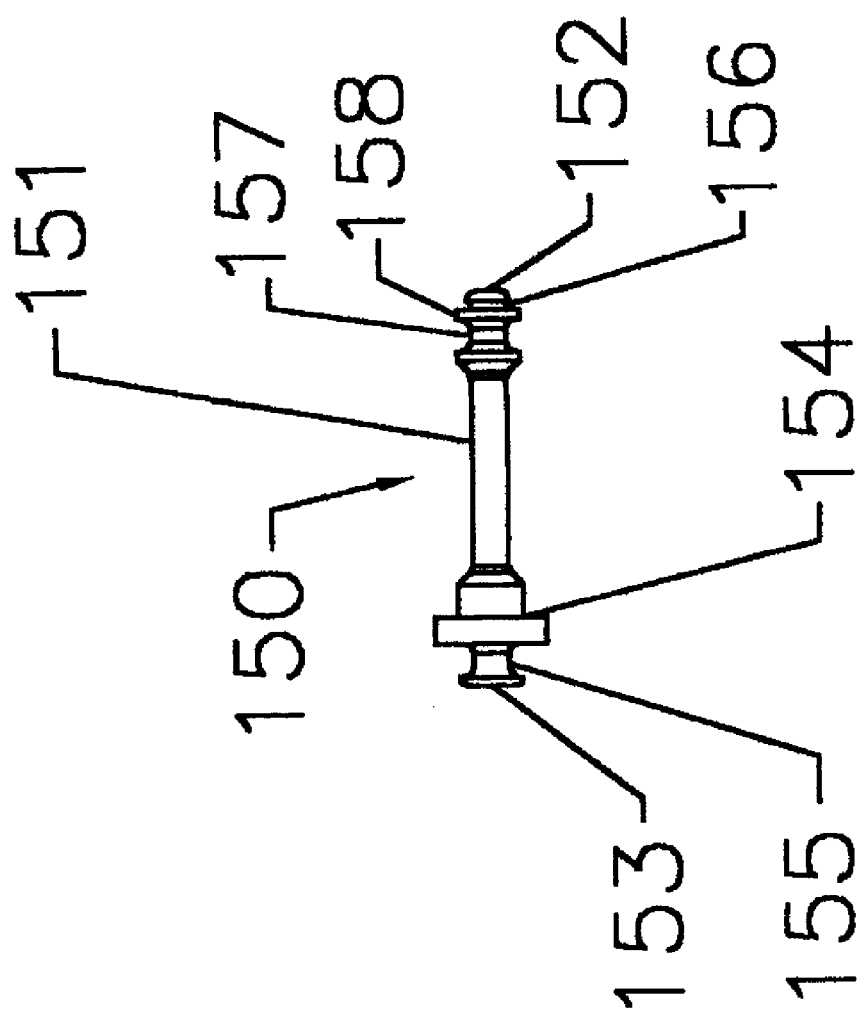

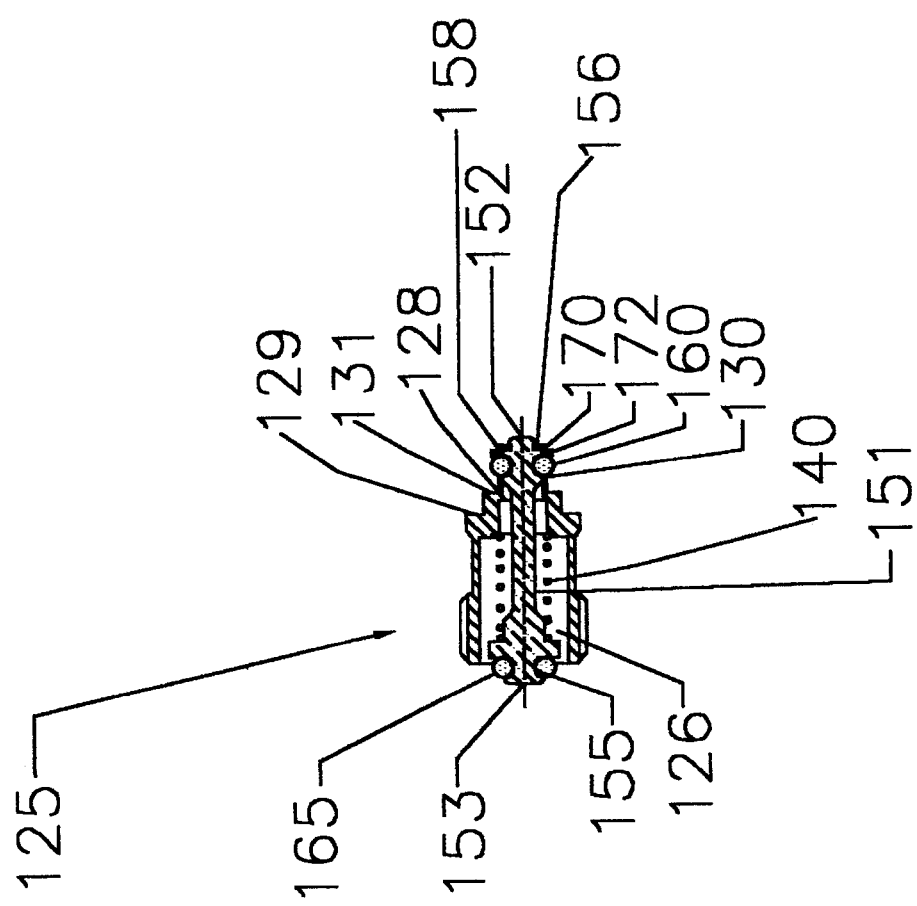

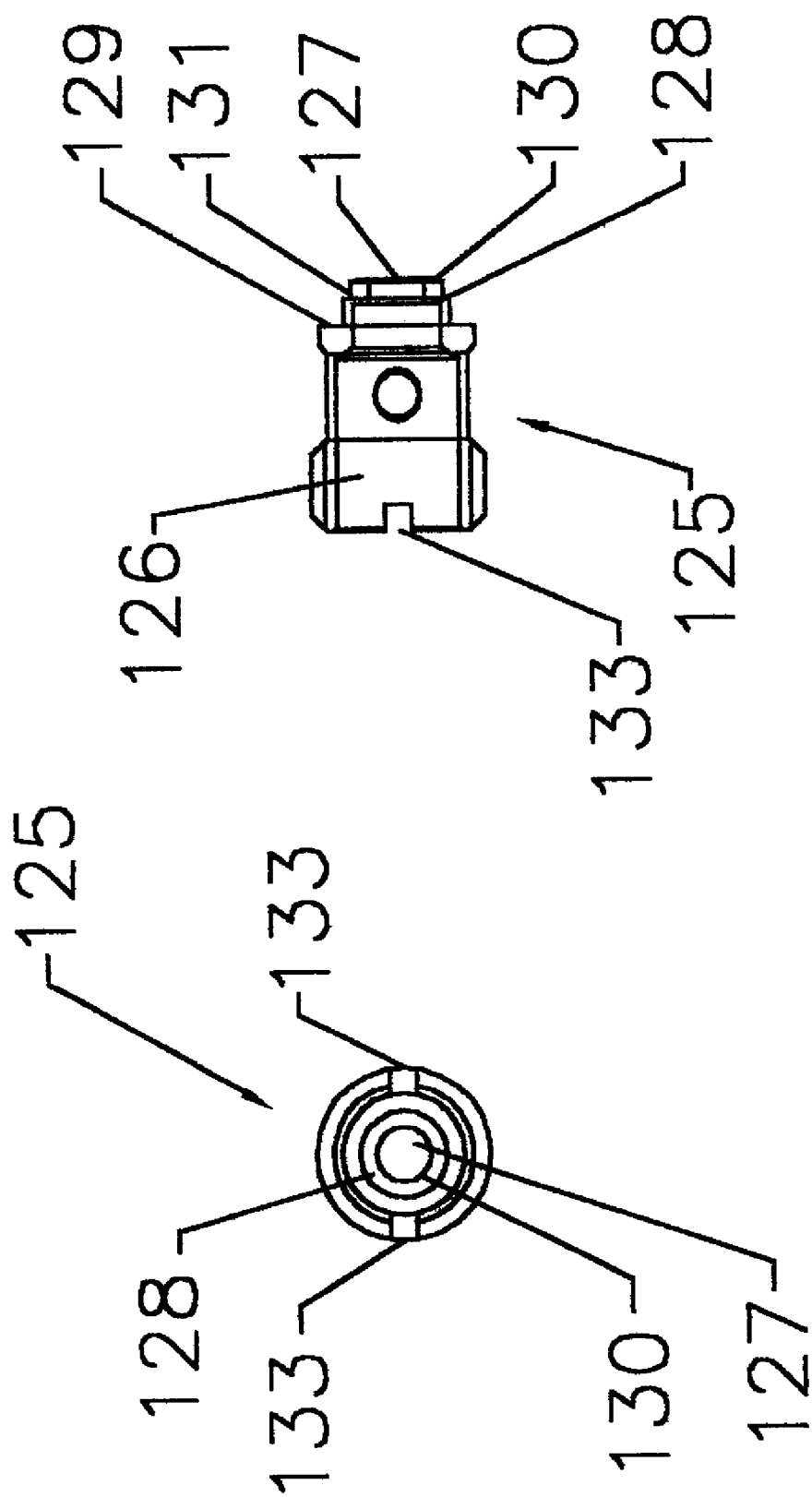

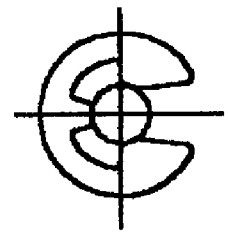
FIG 23

PRESSURE COMPENSATOR FLOW CONTROL

This application claims benefit of Prov. No. 60/154,999 filed Sep. 21, 1999.

BACKGROUND OF THE INVENTION

1. Field of the Invention

This invention relates generally to devices for regulating fluid transmission. More particularly, the invention relates to pressure compensating devices that also control fluid flow.

2. Description of Related Art

One of the requirements associated with many fluid transmission tasks is the need to control fluid flow. A problem often encountered when controlling fluid flow, particularly at a constant rate, is the presence of pressure variations that can adversely affect the ability to control fluid flow at a constant rate. Fluid flow rates are proportional to both flow resistance and the differential pressure across the resistance. One way of solving the pressure problem is to maintain the differential pressure across a known resistance at a fixed value. By accomplishing this, flow rate remains constant.

Numerous control mechanisms have been devised to address the pressure variation problem. All such mechanisms achieve pressure control by utilizing two restrictions, the first one variable, e.g., a reducing valve, and the second one fixed, e.g., a reference restriction. During operation of such mechanisms, the reducing valve is modulated to maintain a constant pressure differential across the reference restriction. A sensor, e.g., a piston, diaphragm or electronic sensor, monitors the pressure drop across the reference restriction and produces a signal relative to the differential pressure. The signal, (physical displacement, voltage, current, etc.), produced is used to modulate the reducing valve. Modulation of the reducing valve in response to the pressure differential across the reference restriction maintains a constant differential pressure.

The reference restriction can be a fixed orifice, variable orifice or nozzle. Desired flow rate is achieved by sizing the reference restriction accordingly.

One of the main problems with conventional pressure compensating flow control devices ("PCFC") is that they are not designed to handle low flow rates and pressures. Most PCFCs on the market today are designed to handle flow rates on the order of 0.5 to 5 gallons per minute and pressure in the 60 to 3,000 pounds per square inch (psi) range.

A further problem is sizing. Most PCFCs do not have assimilated components so their applications are limited. A yet further problem is the use of active controls to sense the pressure differentials and to electronically control the pressure-reducing valve.

Accordingly, it is an object of the present invention to eliminate the need for active controls for a PCFC. A further object is to combine the functions of multiple components into fewer components to reduce overall size for miniature applications. A yet further object is to provide a PCFC that is capable of handling low flow rates (0.0 to 0.017 gal/hr.) and low pressure rates (10–60 psi).

SUMMARY OF THE INVENTION

The PCFC invention described herein employs a novel needle valve/reducing valve assembly to streamline the PCFC for flow control applications that require minimum space utilization. The needle valve that acts as the reference restriction is situated to be in axial alignment with a piston/reducing valve assembly that modulates in response to the pressure differential across the needle valve. A spring is employed to maintain a fixed differential pressure across the needle valve.

The piston/reducing valve assembly has an axially extending internal fluid channel that eliminates the need for external connections to connect upstream fluid chambers with downstream fluid chambers in order to effectuate pressure differential control. This configuration results in the same upstream and downstream pressures acting on the reference restriction to also act on the reducing valve that modulates in response thereto to maintain the differential pressure constant. No outside power or control signals are needed for the PCFC to operate and perform the intended functions.

The PCFC of the present invention has the capability of maintaining flow rates of about 5 to about 60 cc/min. within 10% of setpoint with supply pressures fluctuating between 15 to 75 psig. These and other objects and features of the present invention will be apparent from a review of the drawings and a reading of the following detailed description of the invention.

BRIEF DESCRIPTION OF THE DRAWINGS

FIG. 1 is a plan view of a PCFC in accordance with one embodiment of the invention.

FIG. 1a is a partial plan view of a PCFC in accordance with one embodiment of the invention.

FIG. 2 is a plan view of an Upper Body of a PCFC in accordance with one embodiment of the invention.

FIG. 3 is a sectional view of an Upper Body of a PCFC in accordance with one embodiment of the invention.

FIG. 4 is a top view of an Upper Body of a PCFC in accordance with one embodiment of the invention.

FIG. 5 is a side elevational view of a Lower Body of a PCFC in accordance with one embodiment of the invention.

FIG. 6 is a sectional view of a Lower Body of a PCFC in accordance with one embodiment of the invention.

FIG. 7 is a top view of a Lower Body of a PCFC in accordance with one embodiment of the invention.

FIG. 19 is a side view of a valve stem in accordance with one embodiment of the invention.

FIG. 20 is a plan view of a reducing valve sub-assembly in accordance with one embodiment of the invention.

FIG. 21 is a side view of a valve body in accordance with one embodiment of the invention.

FIG. 22 is a top view of a valve body in accordance with one embodiment of the invention.

FIG. 23 is a top view of an e-clip in accordance with one embodiment of the invention.

DETAILED DESCRIPTION OF THE INVENTION

Figure 9:
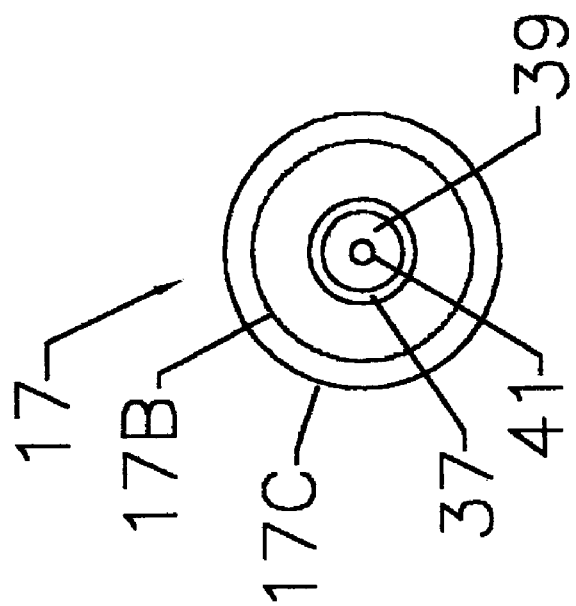
FIG. 9 is a top view of a piston for a PCFC in accordance with one embodiment of the invention.

At the outset, the invention is described in its broadest overall aspects with a more detailed description following. Referring to FIGS. 1,1a, 2 and 3, a PCFC according to one embodiment of the invention is shown. The PCFC, shown generally as 1, comprises an upper body 2 which houses a restriction reference and has portions that define a fluid outlet, and a lower body 3 which houses a piston reducing valve assembly and has portions that define a fluid inlet.

Upper body 2 has portions that define a packing nut bore 4 and further portions that define a fluid outlet 10. In a preferred embodiment, packing nut bore 4 is in fluid communication with fluid outlet 10. Upper body 2 has further portions that define a main fluid chamber 14 that is adapted to receive a piston rod/piston assembly described in detail below. Main fluid chamber 14, in one embodiment, preferably opens on a bottom end 2a of upper body 2. Fluid outlet 10 is in fluid communication with main fluid chamber 14 via a connector channel 14a.

Packing nut bore 4 is adapted to receive a packing nut 5. Packing nut bore 4 is preferably threaded to engage the external threading of packing nut 5.

Figure 15:
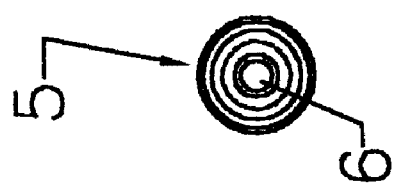
FIG. 15 is a top view of a PCFC cap in accordance with one embodiment of the invention.
Figure 14:
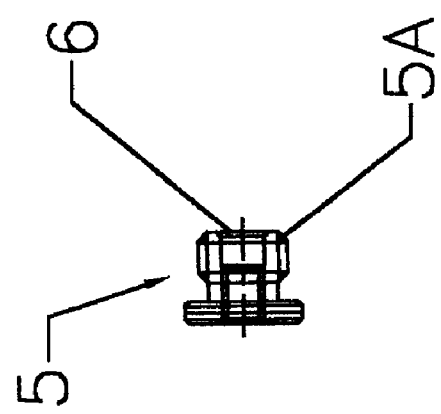
FIG. 14 is a side elevational view of a PCFC cap in accordance with one embodiment of the invention.
Figure 16:
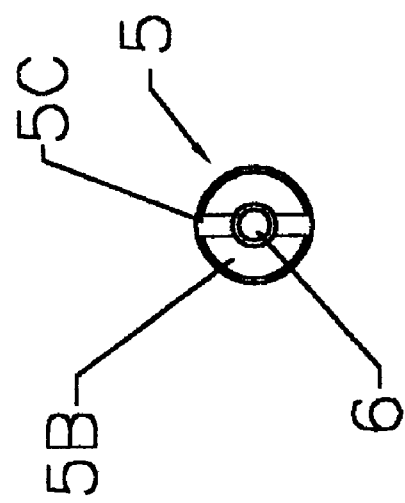
FIG. 16 is a bottom view of a PCFC cap in accordance with one embodiment of the invention.

Referring now to FIGS. 14–16, packing nut 5 (also known as a PCFC cap), has portions that define a central packing nut bore 6 that is adapted to receive a needle valve 7. Central packing nut bore 6 is preferably threaded to enable threading engagement with needle valve 7. Packing nut 5 preferably has external threading on a bottom end 5a for engagement with the treading of packing nut bore 4. Preferably, a transverse slot 5c is provided on a top surface 5b of packing nut 5 to allow for the torquing of packing nut 5 into packing nut bore 4.

Figure 17:
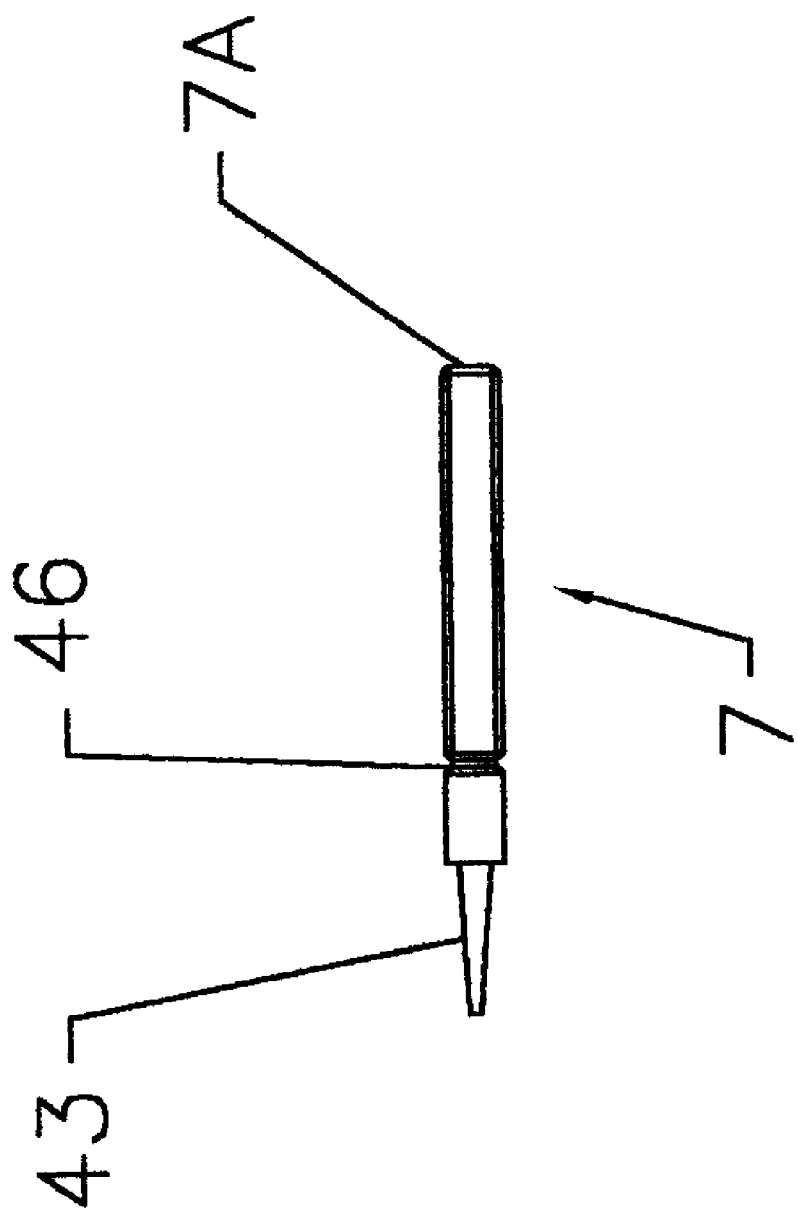
FIG. 17 is a side elevational view of a needle valve for a PCFC in accordance with one embodiment of the invention.

Referring now to FIG. 17, needle valve 7 is shown which performs the reference restriction function. Needle valve 7 preferably has threading along a portion of its length for engagement with the threading of central packing nut bore 6. Needle valve 7 acts to provide a set differential past which fluid entering the PCFC travels from lower body 3 to main fluid chamber 14 in upper body 2. This structural relationship enables the reference differential pressure to remain constant throughout the flow range. Needle valve 7 has a tapered end point 43 that allows for the adjustment of flow rate. Preferably, a 360° turn of the preferably 10–32 threaded needle valve results in 60 cc/min. of flow rate change. Needle valve 7 has portions defining a circumferential channel 46 for receiving needle valve o-ring 9. Preferably, needle valve 7 has further threading situated proximal to a top end 7a to receive in threading engagement, a threading adapter 47.

Figure 18:
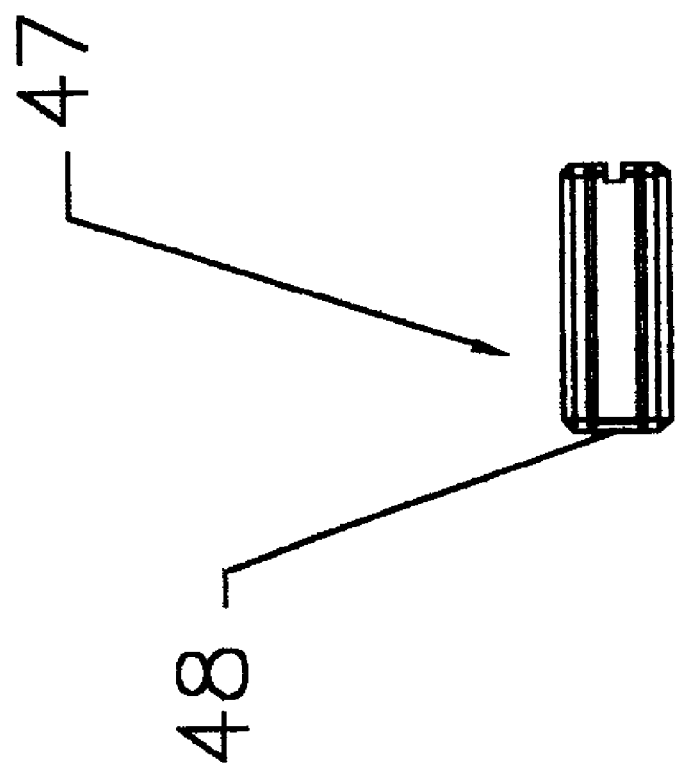
FIG. 18 is a side view of an adapter for a PCFC in accordance with one embodiment of the invention.

Referring to FIGS. 1 and 18, threading adapter 47 is shown which has 10–32 and 8–32 internal threading situated in an internal bore 48 for receiving a top end of needle valve 7 and a lock 49. Lock 49 is provided with external threading to engage the internal threading of threading adapter 47. Lock 49 allows for the fine tune adjustment of needle valve 7 along with the ability to secure the position of needle valve 7 during operation. In a preferred embodiment, threading adapter 47 has a knurled outer surface to facilitate grasping when lock 49 is manipulated.

Referring again to FIGS. 1–4, upper body 2 has a needle valve o-ring receiving portion 8 that is preferably tapered to receive and provide a seat for a needle valve o-ring 9 that seals off packing nut bore 4 from fluid outlet 10. Needle valve o-ring 9 is preferably press fit into needle valve receiving portion 8.

Upper body 2 has further portions that define a piston rod receiving bore 11 that receives piston rod 12 (described below). Piston rod 12 is secured or affixed to upper body 2. Throughout the operation of the PCFC, piston rod 12 remains stationary within upper body 2. To prevent rotational movement of piston rod 12 relative to upper body 2, the portion of piston rod 12 that registers on upper body 2 and piston rod receiving bore 11 can be shaped with mating geometric shapes such as hexagonal shapes.

A piston rod o-ring 13 is provided to seal off main fluid chamber 14 situated in upper body 2 from outlet 10 at the point where piston rod 12 registers on upper body 2. It is to be understood that piston rod o-ring 13 does not seal off main fluid chamber 14 from outlet 10 which are in constant fluid communication via connector channel 14a.

A reference spring 15 is provided in main fluid chamber 14 to apply force to piston 17 such that piston 17 is biased toward the bottom of lower body 3. Piston 17 is in contact with portions of the aforementioned reducing valve (described in detail below), which modulates in unison with the movement of piston 17. Upper body 2 has a piston orifice 16 for receiving a top portion 17a of piston 17.

Figure 8:
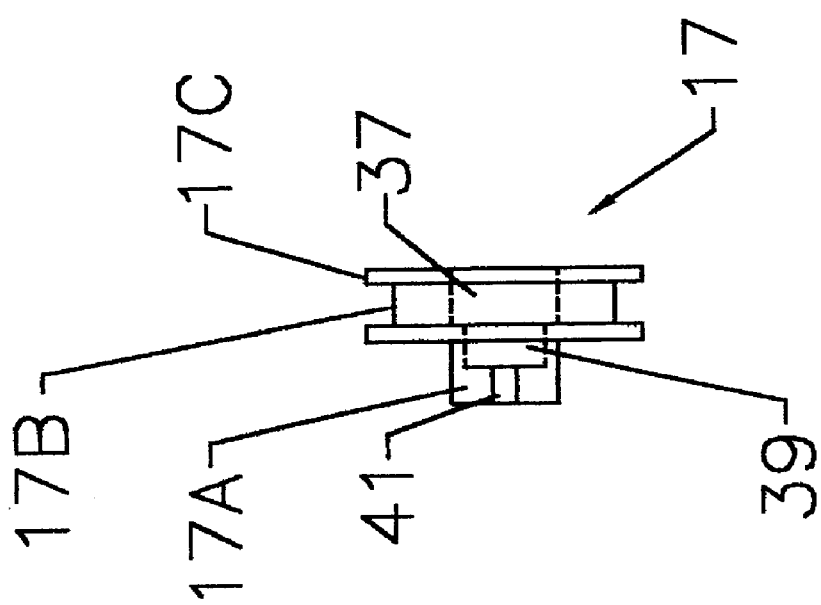
FIG. 8 is a side elevational view of a piston for a PCFC in accordance with one embodiment of the invention.

Referring now to FIGS. 8 and 9, piston 17 has portions defining a piston seal cap bore 37 for receiving a piston seal cap 38. Piston 17 has further portions defining a seal cap o-ring bore 39 for receiving a seal cap o-ring 40. Piston 17 has additional portions defining a piston rod bore 41 for receiving piston rod 12. Piston seal cap bore 37, seal cap o-ring bore 39 and piston rod bore 41 are preferably all concentric.

An annular channel 17b is provided along a circumference of a bottom portion 17c of piston 17 to receive a piston o-ring 21. Piston o-ring 21 seals piston 17 in sliding engagement with interior portions of lower body 3 so that two discreet fluid chambers, a top fluid chamber 18a and a bottom fluid chamber 18b, are created on the top and bottom sides of piston 17. It is the pressure differential in these two fluid chambers that is sensed by the combination of reference spring 15 and piston 17.

Figure 13:
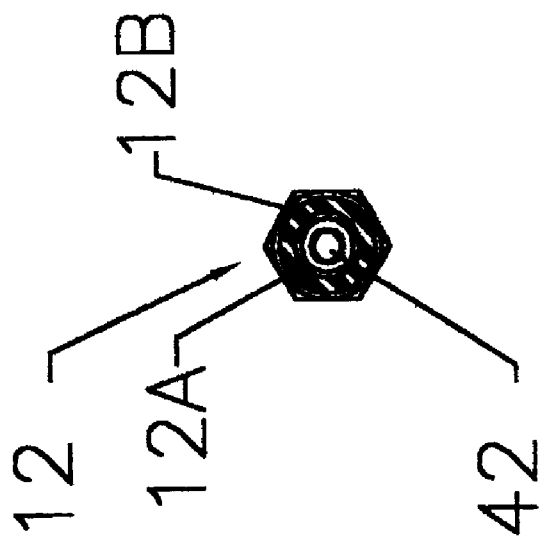
FIG. 13 is a top view of a piston rod for a PCFC in accordance with one embodiment of the invention.
Figure 12:
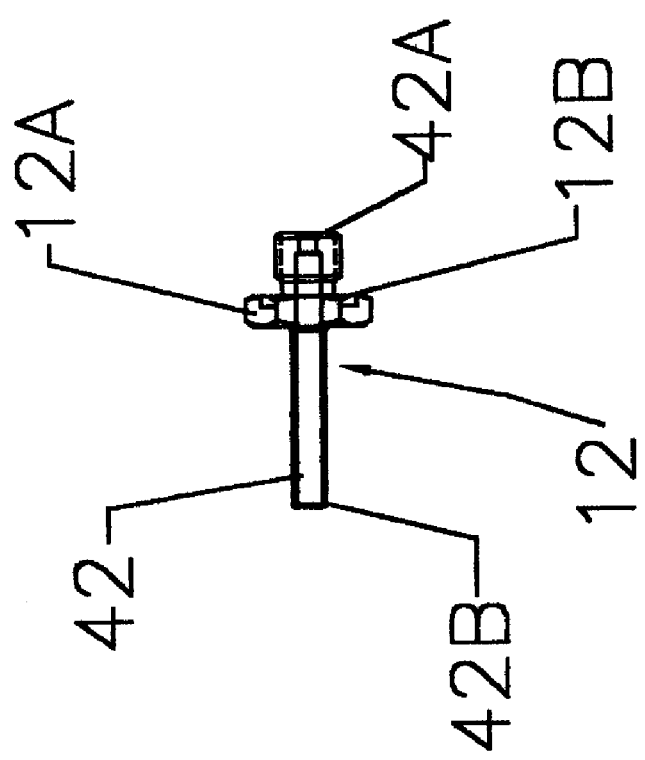
FIG. 12 is a side elevational view of a piston rod for a PCFC in accordance with one embodiment of the invention.

Referring to FIGS. 12 and 13, piston rod 12 has portions that define an inner fluid channel 42 that is in fluid communication with outlet 10 and bottom fluid chamber 18b. The dimensions of inner fluid channel 42 at a first piston rod end 42a are set to receive an end point 43 of needle valve 7 (shown in FIG. 17), which is tapered to allow for the adjustment of fluid flow out of inner fluid channel 42. Piston rod 12 has a second piston rod end 42b that is adapted to receive piston seal cap 40. Piston rod 12 has further portions 12a that are adapted to receive implements for torquing piston rod 12 into upper body 2. As stated above, first piston rod end 42a can be given a geometric shape that mates with a corresponding geometric shape of piston rod receiving bore 11 to rotationally lock piston rod 12 to upper body 2. In an alternative embodiment, piston rod receiving bore 11 and first piston rod end 42*a* can be threaded to achieve engagement of piston rod 42*a* to upper body 2.

An annular piston rod o-ring channel 12*b* is provided in portion 12*a* for receiving piston rod o-ring 13. As stated above, piston rod o-ring 13 seals main fluid chamber 14 from outlet 10 where piston rod 12 registers on upper body 2.

Figure 11:
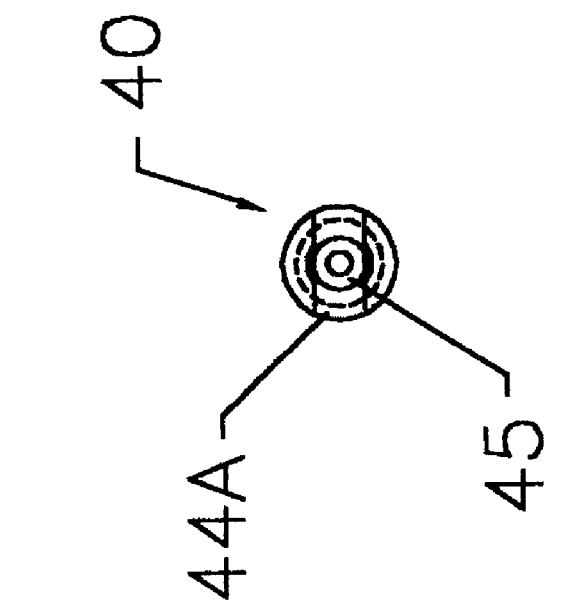
FIG. 11 is a top view of a piston seal cap in accordance with one embodiment of the invention.
Figure 10:
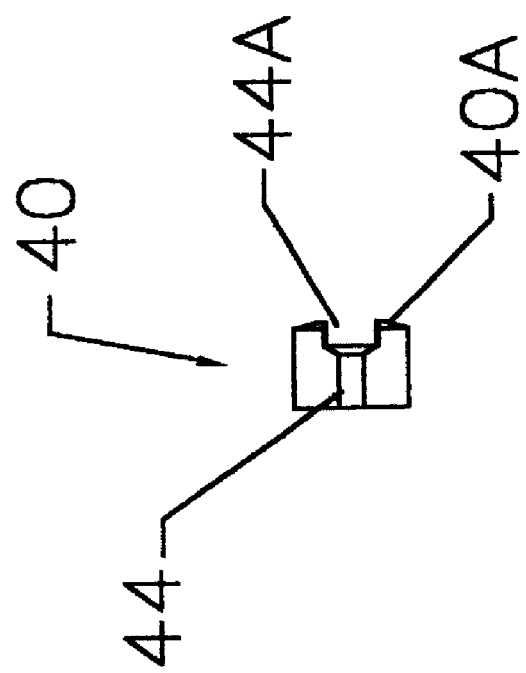
FIG. 10 is a side elevational view of a piston seal cap in accordance with one embodiment of the invention.

Referring to FIGS. 10 and 11, piston seal cap 40 has portions that define a central aperture 44 that is in fluid communication with central channel 42 and bottom fluid chamber 18*b*. A transverse seal cap channel 44*a* provides constant fluid communication with bottom fluid chamber 18*b*. A bottom end 40*a* of piston seal cap 40 is preferably chamfered to receive valve stem 125. Piston seal cap 40 has further portions, which define a piston rod receiving bore 45 for receiving piston rod 12.

Referring to FIGS. 5, 6 and 7, lower body 3 has two axially extending tabs 3*a* and 3*b* portions which define an upper body receiving bore 18 and which are adapted to receive in mating engagement upper body 2. Tab 3*a* has portions that define an outlet extension port 3*c* that aligns with and is in fluid communication with outlet 10. A housing o-ring 19 provides a seal between upper body 2 and lower body 3. Lower body 3 has portions that define a main piston bore 20 that is in frictional sliding contact with piston 17. The combination of piston bore 20, piston 17 and piston o-ring 21 form upper fluid chamber 18*a* and lower fluid chamber 18*b*.

The volumes of the fluid chambers fluctuate with the movement of piston 17. An increase in upstream pressure will temporarily move piston 17 toward upper body 2 and thereby increase the volume of lower fluid chamber 18*b*. A reduction in upstream pressure will cause piston 17 to modulate toward inlet 29 and thereby decrease the volume of lower fluid chamber 18*b*. When the volume of lower fluid chamber 18*b* is increased, upper fluid chamber 18*a* will experience a decrease in volume and vice versa. The amount of volume change for each fluid chamber at any given time will be identical.

Lower body 3 has further portions which define a valve bore 24 which is adapted to receive a valve body 125 (described in more detail below). A valve body o-ring 26 seals a valve bore bottom 27 of valve bore 24 from a valve body bottom 28 of valve body 125. Optionally, washer 36 is sandwiched between valve bore bottom 27 and an external o-ring shoulder 129 of valve body 125. To secure valve body 125 to lower body 3, valve bore 24 is provided with treading while valve body 125 is provided with external threading that mates with the threading of valve bore 24.

Alternatively, a bayonet connection can be used as shown in FIGS. 2, 5, 5*a* and 6. The connection consists of two arcuate upper body tabs 2*b* that project radially outwardly from the side of upper body 2. Slots 3*d* are formed on the inside surface of tabs 3*a* and are dimensioned to receive upper body tabs 2*b*. To connect upper body 2 to lower body 3 with this connection, tabs 3*a* are oriented 90° to upper body tabs 2*b*. The two body sections are then advanced axially toward each other until upper body tabs 2*b* occupy the same plane as slots 3*d*. The two body sections are then counter-rotated 90° or ¼ turn to engage upper body tabs 2*b* to slots 3*d*. To prevent relative a rotation and potential disengagement of upper body 2 to lower body 3, a through bore (not shown) is formed through the sidewall of lower body 3 and a coplanar partial bore is formed in the sidewall of upper body 2. The partial bore formed in upper body 2 is preferably threaded. Preferably, a screw (not shown) is inserted into the through bore in lower body 3 and rotated into the partial bore in upper body 2. The exact placement of the bores and screw is not essential so long as the screw penetrates no fluid chambers within PCFC 1.

Lower body 3 has portions that define an inlet 29. Inlet 29 is in fluid communication with an interior portion of valve body 25 that is described in more detail below. Inlet 29 is not in fluid communication with valve bore 24. Fluid communication between these chambers of lower body 3 is prevented by the combination of valve body 125 and valve body o-ring 26.

Referring now to FIGS. 20–22, valve body 125 is shown having portions which define a valve body fluid chamber 126. Valve body 125 has further portions that define a bottom valve aperture 127. A valve seat 130 is provided along the perimeter of bottom valve aperture 127 to arrest movement of a valve stem 150. Preferably, valve a seat 130 is tapered or chamfered to improve the seal between valve seat 130 and valve stem 150 when the two elements are in contact.

Valve stem 150, shown in FIG. 19, is sized and adapted to slide within bottom valve aperture 127. The addition of a first valve stem o-ring 160 prevents passage of a bottom end 152 of valve stem 150 past valve seat 130. Registration of first valve stem o-ring 160 on valve seat 130 functions to interrupt fluid communication between inlet 29 and valve body fluid chamber 126.

Valve body 125 has internal shoulder 128 that provides a seat for valve spring 140 as shown in FIGS. 1 and 20. Valve spring 140 acts to force valve stem 150 toward piston 17. Valve spring 140 is preferably a cylindrical helical spring that is loaded axially in compression to accomplish the function of forcing valve stem 150 into valve seat 130 that effectively shuts down fluid flow into the PCFC. By design, valve spring 140 has less of an axial compression load than reference spring 15. This ensures that the PCFC will be in an open position with the initial influx of fluid. Valve body 125 has an external o-ring shoulder 129 for receiving valve body o-ring 26. A washer shoulder 131 which is preferably adjacent to external o-ring shoulder 129 provides a support surface for a valve body washer 136 which acts as a buffer between lower body 3 and valve body o-ring 26.

Situated on a top surface 132 of valve body 125 are slots 133. Slots 133 facilitate the insertion of valve body 125 into lower body 3 by providing a contact surface for an implement such as a screwdriver when valve body 125 is provided with external threading and lower body 3 is provided with internal threading along the walls of valve bore 24.

Referring now to FIGS. 19 and 20, valve stem 150 is shown having an axially extended main shaft 151, a bottom surface 152 and a top surface 153. Both ends of valve stem 150 are preferably radiused for ease of assembly and to prevent any potential damage to the o-rings when assembled onto valve stem 150. Valve stem 150 has a radially extending valve spring shoulder 154 for receiving a top end of valve spring 140. A top annular channel 155 is provided proximal to top surface 153 to receive a second valve stem o-ring 165. Valve stem o-ring 165 acts as a dampening or cushioning device to ameliorate any sudden large pressure changes such as at start-up and shut-down. In short, second valve stem o-ring 165 prevents piston damage via the abrupt contact between piston seal cap 38 and top surface 153 of valve stem 150. It is to be understood that second valve stem o-ring 165 forms no part of the invention. By design, valve stem 150 is sized and adapted to freely slide within and past the top surface of valve body 125 even when assembled with second valve stem o-ring 165.

Valve stem 150 has a bottom annular channel 157 situated proximal to bottom surface 152 to receive first valve stem o-ring 160 which seals valve stem 150 into valve seat 130. Valve stem 150 has an annular E-clip channel 156 that is adapted to receive an E-clip 170, shown in FIG. 23. E-clip 170 provides additional support for first valve stem 0-ring 160 when o-ring 160 is forced against valve seat 130. E-clip 170 prevents o-ring slippage off the bottom of valve stem 150. Optionally, a valve stem washer 172 can be added around a radially extended washer receiving surface 158 of valve stem 150 to assist in the support provided to bring 160 by E-clip 170.

A PCFC constructed according to the preceding description has several unique operational characteristics. The first spring, i.e., reference spring 15, maintains the fixed differential pressure across the needle valve. It should be noted that in order for the PCFC to operate properly, there must be an adequate supply pressure available to generate the differential pressure called for by the spring. Since the reducing valve is, by design, not of the balanced type, it creates a differential pressure offset depending on the supply pressure. Due to the nature of an unbalanced valve, it will tend to open slightly more than necessary or close slightly more than necessary depending on the pressure demand. For example, upon a rise in supply pressure (or decrease in downstream pressure), the valve will close slightly more than necessary and cause flow to decrease. This particular condition can be advantageous in certain applications since the regulator will ultimately shut off entirely, acting as a flow limiter. In either case, the effect is that flow will typically swing 5% to 10% over a range of +/−25 psi depending on the flow rate (lower flows have less error). This figure is typical for nominal supply pressures of around 50 psig. Nominal supply pressures above 50 psig will have less error.

An important consideration when constructing a PCFC according to the present invention is the materials used for the various components. A key issue is the coefficient of thermal expansion for the materials used. For example, brass and stainless steel expand at different rates. If stainless steel is used for the needle valve and brass is used for the upper body and the piston rod, different rates of expansion due to heat exposure from sources such as the fluids being fed through the PCFC can result in changes to the desired fixed differential provided by the needle valve.

To avoid this problem, materials should be selected that have similar coefficients of thermal expansion. It has been found that the use of AISI (American Iron and Steel Institute) 303 stainless steel or any 300 series stainless steel for the needle valve, upper body and piston rod eliminates the problem. The use of plastics for components such as the upper body has also proven to provide acceptable thermal expansion M characteristics when metals such as stainless steel are used for the other components.

A PCFC made in accordance with the present invention operates in the following manner. Valve stem spring 140 is designed to force the reducing valve shut by compensating the force generated by reference spring 15 which to exceed the force generated by valve stem spring 140 so that the reducing valve remains open prior to the introduction of fluid to the PCFC. Reference spring 15 is the sensing element that adjusts the reducing valve for pressure variances both upstream and downstream.

Fluid enters PCFC 1 via inlet 29 at a particular upstream pressure $p_1$. The pressure of the incoming fluid applies a force against the reducing valve that has the tendency to shut down the reducing valve but for the force generated by reference spring 15. The fluid flows past the reducing valve and into piston rod 12 that channels the fluid into main fluid chamber 14 past needle valve 7. The friction experienced by the fluid when passing by needle valve 7 creates the resistance that leads to a pressure drop. The fluid pressure in main fluid chamber 14 is $p_2$. The needle valve when set has a constant area that creates a source of constant resistance. This results in the pressure drop across the needle valve to be constant. Piston 17 adjusts for $\Delta p$ that is the difference between $p_1$ and $p_2$.

If the upstream pressure increases, piston 17 is forced down towards the bottom of main fluid chamber 14 that causes the reducing valve to move towards a closed position. The movement of the reducing valve towards a closed position results in a corresponding drop in pressure.

Conversely, an increase in downstream pressure forces piston 17 down towards the bottom of main fluid chamber 18. This movement of piston 17 pushes open the reducing valve that increases the amount of fluid entering valve body 125 from inlet 29. A simultaneous increase in upstream pressure is also experienced.

It is to be understood that the present invention is by no means limited to the particular constructions herein disclosed and/or shown in the drawings, but also comprises any modifications or equivalents within the scope of the claims.

Having thus described our invention, what we claim as new and desire to secure by United States Letters Patent is:

1. A pressure compensating flow control device comprising:
   a housing having a upper body and a lower body wherein the upper body is sized to matingly engage the lower body;
   a piston chamber formed in the housing for receiving a piston in sliding engagement, the piston chamber has a top surface, a bottom surface and at least one side wall;
   a fluid inlet defined by portions of the lower body;
   a fluid outlet defined by portions of the upper body;
   a reducing valve situated inside the lower body wherein the reducing valve has portions defining a valve seat formed on a bottom surface of the reducing valve;
   a valve stem situated in the reducing valve that modulates relative to fluid pressure whereby the reducing valve prevents fluid communication between the fluid inlet and the fluid outlet when in a closed position and allows fluid communication between the fluid inlet and the fluid outlet when in an open position;
   a piston situated in the piston chamber wherein the piston slides within the housing and contacts the reducing valve and causes modulation of the reducing valve;
   a piston rod aperture formed in the piston for receiving a piston rod in sliding engagement;
   a piston rod situated in the piston chamber which has a channel provided therein to provide fluid communication between the inlet and the outlet;
   a reference spring which registers on the top surface of the piston chamber and a top surface of the piston wherein the reference spring has an axial load compression that creates a pressure differential; and,
   a needle valve for controlling fluid-flow rate and providing a set pressure differential.

2. The device of claim 1 further comprising a reducing valve spring which forces the reducing valve into a closed position, the reducing valve spring having an axial load compression that is less than an axial load compression of the reference spring.

3. The device of claim 1 wherein the upper body has portions which define a packing nut bore for receiving a packing nut, the packing nut bore is in fluid communication with the outlet.

4. The device of claim 3 further comprising a packing nut situated in the packing nut bore for receiving the needle valve.

5. The device of claim 3 wherein the packing nut has portions defining a needle valve bore and portions defining a needle valve o-ring channel for receiving an o-ring.

6. The device of claim 4 further comprising an o-ring situated within the needle valve o-ring channel wherein the o-ring prevents fluid communication between the needle valve bore and the outlet.

7. The device of claim 1 further comprising a thread adapter having an aperture to receive the needle valve in threading engagement.

8. The device of claim 7 wherein the thread adapter has a knurled outer surface to aid grasping.

9. The device of claim 8 further comprising a lock nut having threading on an exterior surface and adapted to be received in the thread adapter aperture wherein the lock nut engages the needle valve and prevents rotational movement of the needle valve when in contact with the needle valve.

10. The device of claim 1 wherein the piston rod has portions which define a piston rod o-ring channel for receiving an o-ring.

11. The device of claim 10 further comprising a piston rod o-ring situated in the piston rod o-ring channel wherein the piston rod o-ring prevents fluid communication between the outlet and the piston chamber at the point where the piston rod contacts the upper body.

12. The device of claim 1 wherein the piston has a lower cylindrical portion which has portions defining a exterior piston o-ring channel on the circumference of the lower cylindrical portion and portions which define an internal o-ring channel that is concentric with the piston rod aperture wherein the channels are adapted to receive o-rings.

13. The device of claim 12 further comprising a first piston o-ring situated in the exterior piston o-ring channel and a second piston o-ring situated in the internal o-ring channel, the first piston o-ring being adapted to provide a seal between the piston and the piston chamber and the second piston o-ring being adapted to provide a seal between the piston rod and the piston.

14. The device of claim 13 wherein the piston has further portions defining a piston seal cap bore for receiving a piston seal cap.

15. The device of claim 14 further comprising a piston seal cap situated in the piston seal cap bore, wherein the piston seal cap has portions defining a piston seal cap bore for receiving the piston rod and wherein the piston seal cap has a bottom surface that is chamfered.

16. The device of claim 15 wherein the piston seal cap has a seal cap channel formed on the bottom surface of the seal cap wherein the seal cap channel provides constant fluid communication between a lower portion of the piston chamber and the piston rod aperture.

17. The device of claim 1 wherein the valve stem further comprises a first valve o-ring channel situated proximal a top surface of the valve stem and a second valve o-ring channel situated proximal a bottom surface of the valve stem, the channels being adapted to receive o-rings.

18. The device of claim 17 further comprising a first valve o-ring situated in the first valve o-ring channel and a second valve o-ring situated in the second valve o-ring channel, wherein the first valve o-ring is adapted to provide a cushion between the piston seal cap and the valve stem and the second o-ring is adapted to provide a seal between a bottom end of the valve stem and the valve seat of the valve body.

19. The device of claim 1 further comprising an E-clip affixed to the valve stem wherein the E-clip prevents the second valve o-ring from being forced off the valve stem when the valve stem is in a closed position.

20. A method of compensating pressure fluctuations when controlling fluid flow comprising the steps of:

providing a device comprising:
a housing having a upper body and a lower body wherein the upper body is sized to matingly engage the lower body;
a piston chamber formed in the housing for receiving a piston in sliding engagement, the piston chamber has a top surface, a bottom surface and at least one side wall;
a fluid inlet defined by portions of the lower body;
a fluid outlet defined by portions of the upper body;
a reducing valve situated inside the lower body wherein the reducing valve has portions defining a valve seat formed on a bottom surface of the reducing valve;
a valve stem situated in the reducing valve that modulates relative to fluid pressure whereby the reducing valve prevents fluid communication between the fluid inlet and the fluid outlet when in a closed position and allows fluid communication between the fluid inlet and the fluid outlet when in an open position;
a piston situated in the piston chamber wherein the piston slides within the housing and contacts the reducing valve and causes modulation of the reducing valve;
a piston rod aperture formed in the piston for receiving a piston rod in sliding engagement;
a piston rod situated in the piston chamber which has a channel provided therein to provide fluid communication between the inlet and the outlet;
a reference spring which registers on the top surface of the piston chamber and a top surface of the piston wherein the reference spring has an axial load compression that creates a pressure differential; and,
a needle valve for controlling fluid-flow rate and providing a set pressure differential; introducing fluid into the device;
adjusting the needle valve to regulate fluid flow; and,
regulating the fluid pressure by having the reference spring sense the pressure that causes modulation of the piston, which, in turn, causes modulation of the reducing valve.

* * * * *